July 16, 1929.  M. LOUGHEAD ET AL  1,721,253
METHOD AND APPARATUS FOR CONSTRUCTING NONEXPANSIBLE HOSE
Filed June 8, 1927
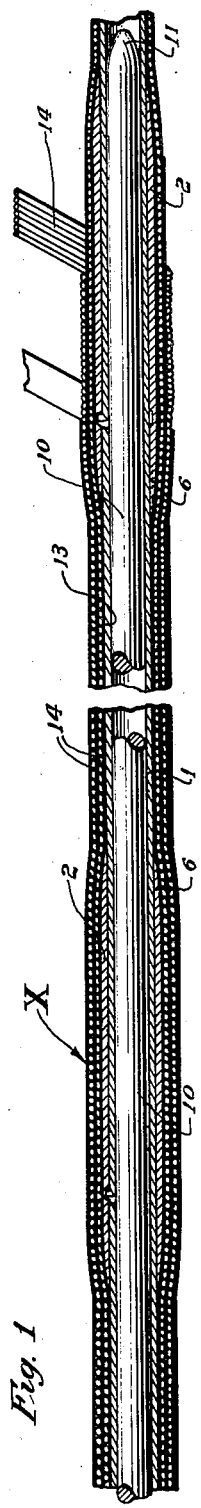
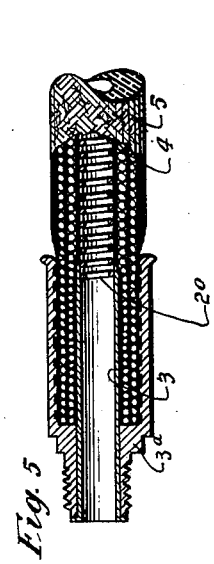
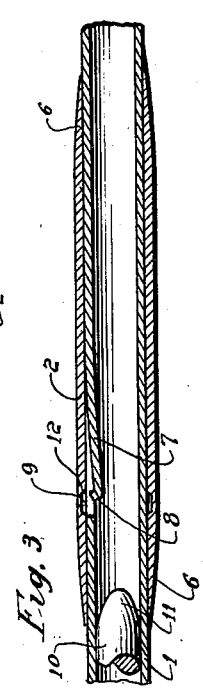
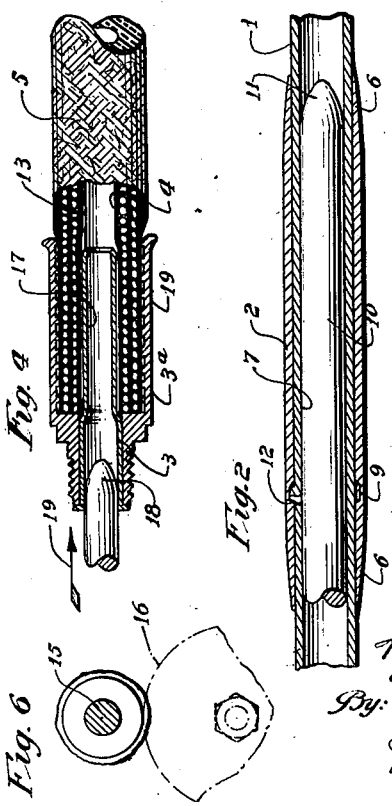
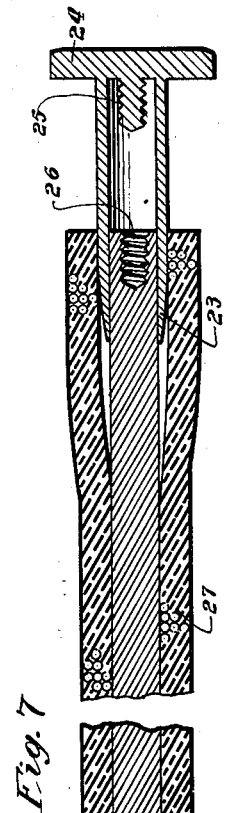
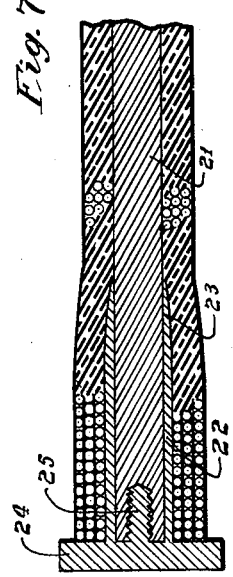
Inventor:
Malcolm Loughead
Donald O. Scott
By: Williams, Bradbury,
McCalet + Hinkle
Atty's.

Patented July 16, 1929.

1,721,253

UNITED STATES PATENT OFFICE.

MALCOLM LOUGHEAD AND DONALD O. SCOTT, OF DETROIT, MICHIGAN, ASSIGNORS TO HYDRAULIC BRAKE COMPANY, OF DETROIT, MICHIGAN, A CORPORATION OF DELAWARE.

METHOD AND APPARATUS FOR CONSTRUCTING NONEXPANSIBLE HOSE.

Application filed June 8, 1927. Serial No. 197,335.

Our invention relates to a method for constructing non-expansible hose and more particularly to that type of flexible hose employed for conducting fluid pressure to the operating cylinders of a hydraulic brake system.

In a hose of this character subjected to high internal pressures, we have found that the most efficient connecting members for the ends of the hose are those which include a metallic nipple which is inserted within the bore of the hose at the end, the adjacent hose portions being subjected to slight expansion approaching the limit of their elasticity and an external sleeve encompassing the hose at the end between which and the nipple the hose is compressed. This type of hose will withstand extremely high internal pressure without developing leaks between the coupling and the hose.

Heretofore to get this tight seal between the nipple and sleeve the fabric of the hose has been expanded, but with the use of a cord fabric which is substantially non-expansible, it is practically impossible to expand the nipples within the bore of the hose sufficiently to effect uniform diameter as between nipple and hose bores without in some instances rupturing the cord.

In the making of a cord fabric hose having very slight expansion under pressure, the cord and embedding material are wound around a mandrel so tightly that after the hose is vulcanized and the mandrel is removed, there is not sufficient elasticity in the cord fabric to insert an inner nipple of desired wall thickness and expand the same so that its bore is the same as that of the hose. Such ruptures may be found when the test pressure is brought up higher than two thousand pounds or may show up only in service.

An object of the present invention is to provide a method and apparatus for constructing a hose in which the end portions of the hose are formed with a slightly greater internal diameter than the major portion so that when the nipples are inserted and expanded in the ends of the hose, the bores of the nipples and of the major portion of the hose are uniform in diameter, and but slight expansion of the hose is caused in the region surrounding the nipple, just sufficient to cause a tight seal.

A further object of the invention is to provide a method and apparatus for the construction of a non-expansible hose in which several lengths of hose may be manufactured as a single unit and the several portions, each forming a length subsequently severed from each other.

A further object of the invention is to provide in a method of the character described, novel apparatus to permit the withdrawal of the unit consisting of several connected hose lengths from the mandrel.

Other objects and advantages will appear more fully from the following description, in which similar reference characters are used for referring to similar parts throughout the views.

In the accompanying drawings, we have illustrated various steps in the method and apparatus employed therefor, in which:

Figure 1 is a sectional view of one end of a unit consisting of several connected hose lengths during the process of manufacture;

Figures 2 and 3 are sectional views of a part of the apparatus illustrated in Figure 1 showing the removable mandrel sleeve and the means for locking the sleeve in place on the mandrel;

Figure 4 is a sectional view of one end of a hose length with the coupling member partially fixed thereto;

Figure 5 is a view similar to Figure 4 but with the coupling member finally secured in place;

Figure 6 is a view illustrating a step in the method of preparing the hose for the reception of the coupling member; and Figure 7 is a sectional view of the apparatus for constructing a single hose length.

In carrying out our invention we construct a substantially non-expansible hose employing cord fabric having its end portions of slightly greater internal diameter than the major portion of the hose.

Of the several methods known for constructing flexible hose we prefer to construct one long unit consisting of several connected lengths and subsequently to cut the unit into the desired separate lengths. In following this procedure, we have devised novel apparatus by means of which a single unit may be constructed having portions thereof at regular intervals representing the abutting ends of separate lengths of greater internal diameter than the major portions of the hose.

The apparatus employed consists of a tubular mandrel 1 which may be about fifty feet in length. The external diameter of the mandrel 1 corresponds with the internal diameter of the major portion of the hose length. A plurality of sleeves are received upon the mandrel 1 and of a thickness slightly less than the thickness of the nipple 3 forming a part of the hose coupling member 3ª (see Figs. 4 and 5). The length of the sleeves 2 is twice the length of that portion of the nipple 3 which is projected within the bore 4 of the hose 5. The ends 6 of the sleeves 2 taper slightly (as shown in Figs. 2 and 3).

The sleeves 2 are disposed upon the mandrel 1 at intervals determinable by the desired separate hose lengths.

Means for locking the sleeves 2 against longitudinal movement on the mandrel 1 during the process of construction is provided in inwardly sheared lips 7 formed in the side wall of the mandrel having outwardly turned portions 8 which are received within annular grooves 9 formed in the inner walls of the sleeves 2 when the lips 7 are forced outwardly.

A rod 10 slidable longitudinally within the mandrel 1 and having its end tapered as shown at 11, serves to move the lips 7 outwardly with their portions 8 engaging with the grooves 9 when the rod is projected through the bore of the mandrel.

Means for assuring removal of the sleeves 2 from the mandrel 1 should the lips 7 fail to move inwardly upon withdrawal of the rod 10 consists in the provision of inclined side walls 12 of the grooves 9.

In carrying out the method, the sleeves 2 are each arranged on the mandrel 1 at their proper predetermined distances from one another and the rod 10 is projected through the bore of the mandrel. This step securely locks the sleeves against movement upon the mandrel as the out-turned portions of the lips engage the grooves 9.

The next step in the method is that of drawing a thin rubber lining 13 over the mandrel and sleeves as shown in Figure 1. Several layers of gum dipped cord 14 and suitable embedding material are thereupon wound over the lining 13 by any well known winding mechanism such as employed in the construction of flexible hose and which is well known in the art.

The rubber and cord fabric hose thus formed are vulcanized by the usual and well known process of vulcanizing while still upon the mandrel.

When the vulcanizing has been completed, the rod 10 is withdrawn from the mandrel, thus permitting the lips 7 of the mandrel to disengage with the sleeves 2 and the entire hose length with the sleeves is withdrawn from the mandrel. Should the lips 7 fail to disengage with the grooves 9 of the sleeves, the tapered walls 12 of the grooves will function to force the lips inwardly and relieve them from engagement with the sleeves.

The next step is that of severing the several separate hose lengths from the single unit. This is done by applying cutters at the midpoint of that portion of the hose overlying the sleeves 2 as at X. The cutters are allowed to cut into the hose at a point midway of the sleeves 2 and the lengths are finally cut from each other by the use of a hot wire. This latter step is to insure against mutilation of the sleeves by the cutters.

The separate hose lengths are next placed upon a rotating spindle 15 and the surfaces thereof at the ends for a distance equal to that of the depth of the sleeve portion of the coupling member 3ª are ground by a grinding wheel 16 so that the thickness of the hose at the end sections is uniform. The coupling members 3ª with the nipples 3 in place are then inserted over the ends of the hose 5 and the nipples 3 are then projected partially within the bore 4 of the hose through the outer end of the coupling members.

The nipple 3 at this time (see Fig. 4) has its innermost end 17 of lesser diameter than the inner enlarged diameter of the bore 4 of the hose.

The plunger 18 is then forced in the direction of the arrow 19 into the nipple so as to cause the nipple to expand and assume the position shown in Figure 5. Inasmuch as the thickness of the nipple 3 is slightly greater than the thickness of the sleeves 2 employed for the formation of the hose, the hose is subjected to slight expansion near its limits of elasticity by this expansion of the nipple. This expansion of the nipples causes the hose to be uniformly and tightly compressed between the external sleeve portion 19 and the nipple 3 of the coupling so that disengagement of the coupling from the hose when subjected to excessive internal pressure cannot take place.

If desired to assure further non-expansibility of the major portion of the hose length, a coiled spring 20 may be inserted within the bore 4 of the hose, at the time during which the hose is under greater internal pressure than when it is in normal use. In the prior Patent No. 1,599,905, issued September 14, 1926, there is shown and described the apparatus and method for inserting the coiled spring 20 within the bore.

A hose thus constructed is incapable of further expansion during use, due to the inherent substantially non-expansible properties of the cord fabric and the bore of the hose as well as the coupling members is uniform throughout.

In Figure 7 we have shown apparatus for constructing such a hose as we have just described in single lengths. This apparatus consists of a solid mandrel 21 having sleeved portions 22 with their inner ends tapered as shown as 23, each of which terminate at their ends in gripping members 24 provided with inwardly extending threaded projections 25 which are received within aligned threaded bores 26 so that the sleeves may be securely fixed against movement upon the mandrel 21. At 27 we have illustrated schematically a hose fabric and cord wound upon the mandrel as during the construction of the hose.

What we claim is:

1. A method for constructing a non-expansible hose unit which consists in wrapping the fabric and imbedding material of the hose about a mandrel having diametrically enlarged portions at spaced intervals thereon, in vulcanizing the hose while still upon the mandrel, in removing the hose from the mandrel, and in fixing coupling members thereto having nipples receivable within the diametrically enlarged portion of the hose.

2. A method of constructing a non-expansible hose unit which consists in placing removable sleeves upon a mandrel to provide a diametrical enlargement of the mandrel at pre-determined distances apart, in winding fabric and suitable imbedding material upon the mandrel while the sleeves are in place thereon, in vulcanizing the hose while upon the mandrel, in removing the hose and sleeves from the mandrel, in removing the sleeves from the hose by cutting the hose at the midpoint of that portion encompassing the sleeves, and in fixing a coupling member thereto having a part receivable within the diametrically enlarged portions of the hose.

3. A method of constructing a non-expansible hose which consists in providing a mandrel having removable sleeves forming diametrical enlargements of the mandrel and means for locking the sleeves against movement with respect to the mandrel at will, in wrapping a non-elastic fabric and suitable imbedding material about the mandrel with the sleeves in place thereon, in vulcanizing the hose so formed while on the mandrel, in unlocking the sleeves from the mandrel, in removing the hose when vulcanized with the sleeves from the mandrel, in severing the hose at the mid-point of the diametrically enlarged portion, and in removing the sleeves therefrom.

4. A method of constructing a non-expansible hose unit which consists in winding non-elastic fabric and suitable imbedding material tightly about a mandrel having diametrically enlarged portions, in vulcanizing the hose while on the mandrel, in removing the hose from the mandrel, in severing the hose at the mid-point of the diametrically enlarged portions, and in fixing coupling members to the enlarged end portions of the separate hose lengths so formed.

5. A method of constructing a non-expansible hose unit which consists in building a non-elastic fabric and rubber hose upon a mandrel having enlargements at that portion of the hose forming the coupling receiving ends, in vulcanizing the hose while on the mandrel, and in subsequently removing the hose from the mandrel and securing coupling members thereto with internal nipples receivable within the diametrically enlarged portion of the hose.

6. Apparatus for constructing a non-expansible hose comprising a mandrel, tubular sleeves slidably disposed upon the mandrel and forming diametrical enlargements thereof, and manually operable means for simultaneously locking and unlocking the sleeves in and out of positive engagement with the mandrel.

7. Apparatus for constructing a non-expansible hose comprising a tubular mandrel, a rod slidable longitudinally within the mandrel, sleeves slidably disposed about the mandrel forming diametrical enlargements thereof, and means associated with the sleeves and with the mandrel for locking the sleeves against longitudinal movement with respect to the mandrel when the rod is projected within the mandrel.

8. A method for constructing a non-expansible hose unit which consists in wrapping the fabric and imbedding material of the hose about a mandrel having diametrically enlarged portions at spaced intervals thereon, in vulcanizing the hose while still upon the mandrel, in removing the hose from the mandrel.

9. A method of constructing a non-expansible hose unit which consists in placing removable sleeves upon a mandrel to provide a diametrical enlargement of the mandrel at pre-determined distances apart, in winding fabric and suitable embedding material upon the mandrel while the sleeves are in place thereon, in vulcanizing the hose while upon the mandrel, in removing the hose and sleeves from the mandrel, and in removing the sleeves from the hose by cutting the hose at the midpoint of that portion encompassing the sleeves.

10. A method of constructing a non-expansible hose unit which consists in winding non-elastic fabric and suitable imbedding material tightly about a mandrel having diametrically enlarged portions, in vulcanizing the hose while on the mandrel, in removing the hose from the mandrel, and in severing the hose at the mid-point of the diametrically enlarged portions.

11. A method of constructing a non-expansible hose unit which consists in building a non-elastic fabric and rubber hose upon a mandrel having enlargements at that portion of the hose forming the coupling receiving ends, and in vulcanizing the hose while on the mandrel.

In witness whereof, we hereunto subscribe our names this 3rd day of June, 1927.

MALCOLM LOUGHEAD.
DONALD O. SCOTT.